United States Patent
Toyoda et al.

(10) Patent No.: US 8,005,130 B2
(45) Date of Patent: Aug. 23, 2011

(54) TRANSMITTER AND RECEIVER USING FORWARD CLOCK OVERLAYING LINK INFORMATION

(75) Inventors: Hidehiro Toyoda, Tachikawa (JP); Tatsuya Saito, Kunitachi (JP); Hiroki Yamashita, Hachioji (JP); Norio Chujo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 925 days.

(21) Appl. No.: 11/826,300

(22) Filed: Jul. 13, 2007

(65) Prior Publication Data

US 2008/0056336 A1    Mar. 6, 2008

(30) Foreign Application Priority Data

Sep. 1, 2006    (JP) ................................ 2006-238161

(51) Int. Cl.
     *H04B 1/38*      (2006.01)
(52) U.S. Cl. ........ 375/219; 375/220; 375/222; 375/371; 375/375; 375/376; 713/500; 713/503
(58) Field of Classification Search .................. 375/219, 375/220, 222, 243, 254, 259, 292, 295, 299, 375/316, 306, 342–344, 135, 150, 211, 223, 375/242, 272, 297, 327, 346, 350; 713/400, 713/500, 513

See application file for complete search history.

(56) References Cited

U.S. PATENT DOCUMENTS

| | | | |
|---|---|---|---|
| 4,486,739 A | 12/1984 | Franaszek et al. | |
| 5,774,698 A * | 6/1998 | Olnowich | 712/1 |
| 7,778,375 B2 * | 8/2010 | Lu | 375/375 |
| 2007/0009060 A1 * | 1/2007 | Lavelle et al. | 375/295 |
| 2007/0047689 A1 * | 3/2007 | Menolfi et al. | 375/376 |
| 2007/0260965 A1 * | 11/2007 | Schmidt et al. | 714/799 |
| 2008/0022145 A1 * | 1/2008 | Murtagh et al. | 713/503 |
| 2008/0065924 A1 * | 3/2008 | Frodsham et al. | 713/400 |

FOREIGN PATENT DOCUMENTS

| | | |
|---|---|---|
| JP | 2005-151410 | 11/2003 |
| WO | WO 97/42731 | 5/1997 |

* cited by examiner

*Primary Examiner* — Shuwang Liu
*Assistant Examiner* — Hirdepal Singh
(74) *Attorney, Agent, or Firm* — Stites & Harbison PLLC; Juan Carlos A. Marquez, Esq.

(57) ABSTRACT

A transmitting and receiving technique in which a load on data signal lines is reduced while maintaining a communication quality, thereby making it possible to improve the throughput of data channels. In a transceiver, a transmitter side has an encoder circuit that transmits a bit sequence obtained by encoding link information to a clock signal line, and a receiver side has a clock and data recovery circuit 17 that extracts a clock component from a signal received from the clock signal line, a decoder circuit 19 that decodes the extracted signal to reproduce the link information, and a bit deskew circuit 21 that adjusts a skew that is lower than one bit on the basis of a clock component.

12 Claims, 6 Drawing Sheets

TRANSMITTER AND RECEIVER USING FORWARD CLOCK OVERLAYING LINK INFORMATION

CLAIM OF PRIORITY

The present application claims priority from Japanese application JP 2006-238161 filed on Sep. 1, 2006, the content of which is hereby incorporated by reference into this application.

FIELD OF THE INVENTION

The present invention relates to a transmitting and receiving technique, and more particularly to an effective technique that is applied to a transceiver, a transmitter, and a receiver of a transmission system in which a clock signal line is transmitted in parallel to a data signal line, which is so-called "clock parallel transmission system.

BACKGROUND OF THE INVENTION

According to the inventor's study, there are techniques of the transceiver stated below.

For example, JP-T No. 11(1999)-511926 discloses a technique of a phase matching circuit in which a synchronization signal that is lower in frequency than a clock signal is superimposed on respective data signals that are transmitted from a transmitter to a receiver in parallel. In the technique, a phase relationship between the respective parallel data signals can be held without causing an increase in the transmission speed of the parallel data signal or an increase in the number of signal lines between the transmitter and the receiver.

Also, JP-A No. 2005-151410 discloses a multi-channel data transmission technique by which the contiguous encoded signal of plural channels are received and then converted into a pair of synchronous binary characters to prevent an influence of skew.

Also, U.S. Pat. No. 4,486,739 discloses a technique of 8B10B that converts parallel data of 8 bits into contiguous data of 10 bits.

SUMMARY OF THE INVENTION

Incidentally, as a result of studying the above-mentioned transceiver technique, the following features have become apparent.

For example, the technique of JP-T No. 11(1999)-511926 applies the configuration of a so-called clock parallel transmission system. The configuration of the transceiver of the above clock parallel transmission system will be described with reference to FIG. 5 as the technique that has been studied as the premise of the present invention.

Figure 5:
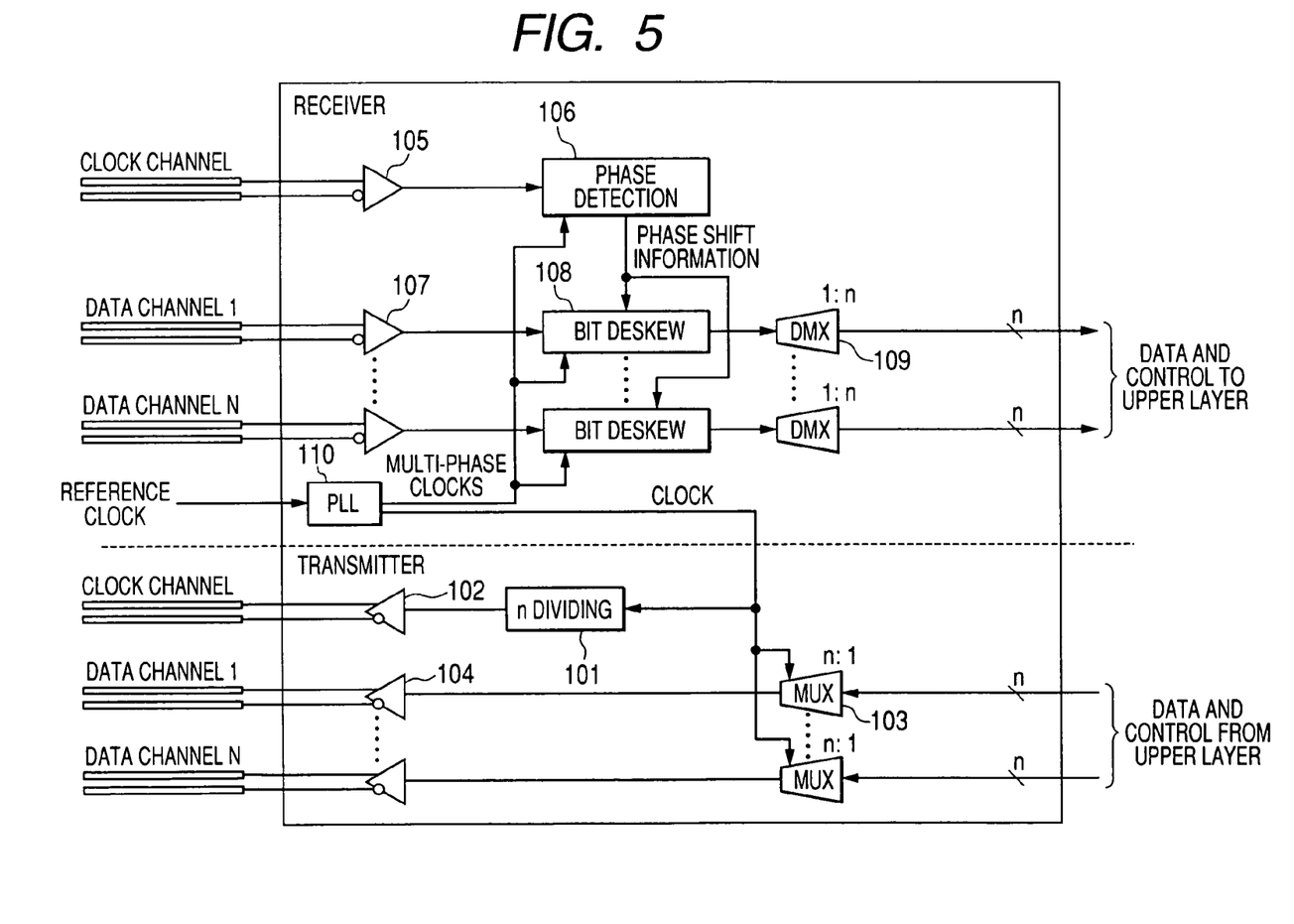
FIG. 5 is a diagram showing a configuration of a transceiver of a clock parallel transmission system that is studied as the premise of the present invention.

As shown in FIG. 5, the transceiver of the clock parallel transmission system includes an n frequency divider circuit 101, a transmission buffer 102, MUX (multiplexer) circuits 103, and transmission buffers 104 at the transmitter side. The transceiver also includes a reception buffer 105, a phase detector circuit 106, reception buffers 107, bit deskew circuits 108, DMX (demultiplexer) circuits 109, and a PLL circuit 110 at the receiver side.

The transceiver of the clock parallel transmission system transmits and receives information data and control data from a higher layer by the aid of the same data channel. In this situation, the transceiver transmits clocks obtained by subjecting real clocks to n frequency divisions by the aid of the n frequency divider circuit 101 in parallel to the data channel so as to transmit and receive the bit contiguous data of 0 and 1. The transceiver extracts phase-shift information from the frequency divided clocks that have been received by the clock channel, and distributes the extracted phase-shift information to the bit deskew circuits 108 at the receiver side. Each of the bit deskew circuits 108 absorbs skew that is equal to or lower than 1 bit, and adds the phase fluctuation of a long period to the absorption of the skew.

On the other hand, the technique of JP-A No. 2005-151410 adopts the configuration of a so-called clock non-parallel transmission system. The configuration of the transceiver of the above clock non-parallel transmission system will be described as the technique that has been studied as the premise of the present invention with reference to FIG. 6.

Figure 6:
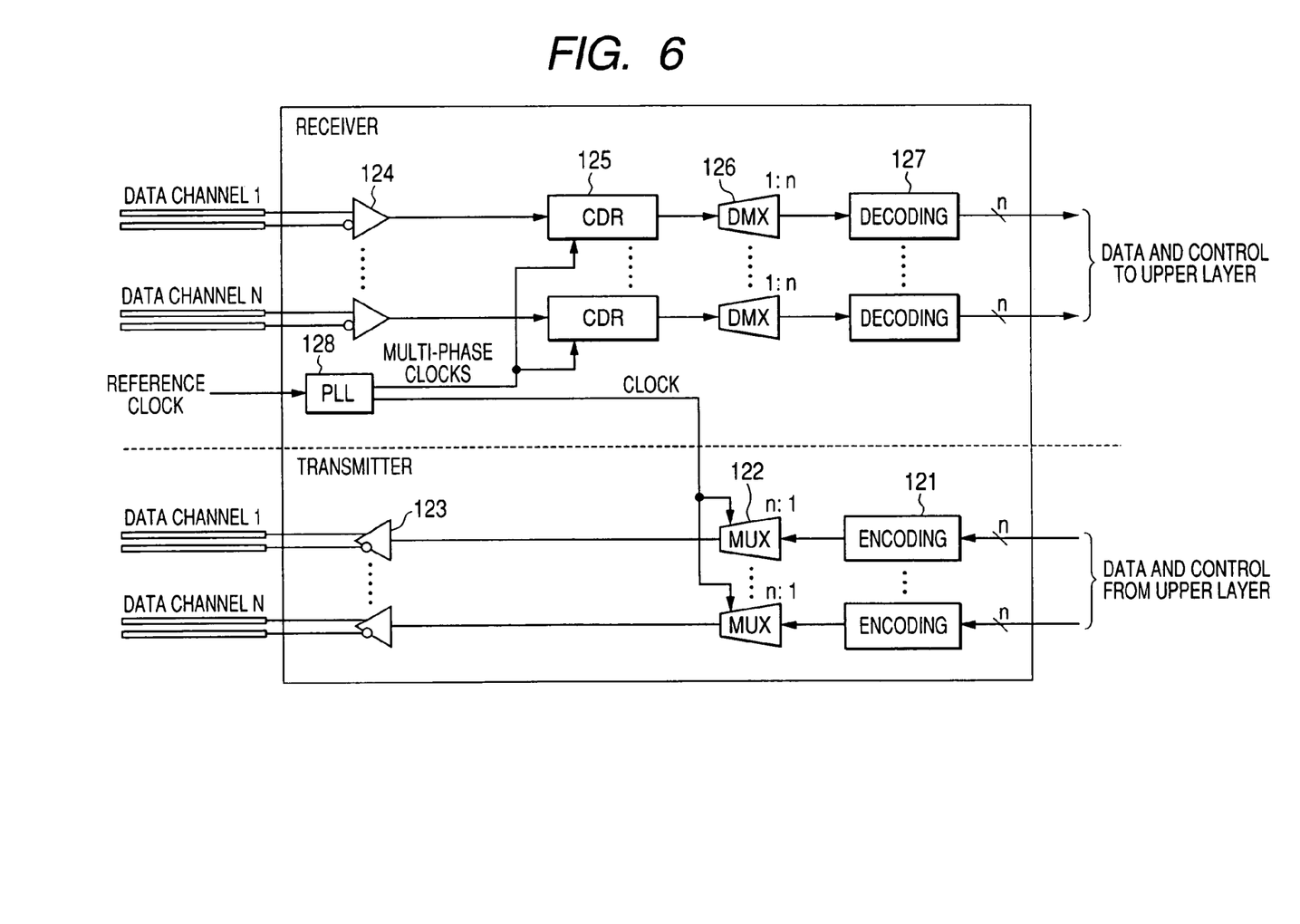
FIG. 6 is a diagram showing a configuration of a transceiver of a clock non-parallel transmission system that is studied as the premise of the present invention

As shown in FIG. 6, the transceiver of the clock non-parallel transmission system includes encoder circuits 121, MUX circuits 122, and transmission buffers 123 at the transmitter side. The transceiver also includes receiver buffers 124, CDR circuits 125, DMX circuits 126, decoder circuits 127, and a PLL circuit 128 at the receiver side.

In the transceiver of the clock non-parallel transmission system, only the data channels are connected to each other. The transceiver encodes and decodes data so as to transmit and receive the bit contiguous data of 0 and 1 (average the appearance probability of 0 and 1 bits). The transceiver also extracts a clock component included in a data string, and reproduces the clocks and the bit data in the CDR circuits 125 that are disposed in the respective data channels at the receiver side.

Incidentally, in the transceiver of the clock parallel transmission system as with the technique disclosed in JP-T No. 11(1999)-511926, a load (the volume of data, processing delay) on data signal lines are large, and therefore it is desirable to reduce the load on the data signal lines. In particular, in a multilink serial interface using plural high-speed serial links, there is a demand to transmit the data with the delay as small as possible.

Under the circumstances, in order to reduce the delay, it is desirable to eliminate the encoder and decoder circuits required at the time of AC connection. However, when the encoder circuit is eliminated at the time of DC connection, it is impossible to compensate a limited run length (the maximum bit contiguous length). For that reason, the clock component is eliminated in the data, and the clock cannot be reproduced (CDR) from the data. That is, it is impossible to follow the frequency fluctuation (wander of PLL) of the long period with the result that bit errors frequently occur.

Under the circumstances, the present invention has been made to solve the above problems, and therefore an object of the present invention is to provide a transmission and reception technique which is capable of reducing the load on the data signal lines while maintaining the communication quality to improve the through-put of the data channel.

The above and other objects and novel features of the present invention will become apparent from the description of the present specification and the attached drawings.

The outline of the representative features in the present invention described in the present application will be described in brief as follows.

The present invention relates to a transceiver, a transmitter, and a receiver. A transmitter of the transceiver or the transmitter transmits a bit sequence obtained by encoding link information to a clock signal line. A receiver of the transceiver or the receiver extracts the clock component from the signals that have been received from the clock signal lines, decodes the extracted signals to reproduce the link information, and adjusts the skew that is lower than 1 bit on the basis of the clock component. In this way, the link information can be transmitted and received between the transmitter and the receiver without using the data channel.

That is, only the data string that is not encoded is transmitted to the data signal lines. In the clock signal line different from the data signal lines, the data string that has been subjected to encoding which is small in pattern jitter is transmitted. The information that is transmitted and received by the aid of the clock signal line superimposes not only the positional information of the clock (including the positional fluctuation information due to the wander) but also link information such as deskew control information, byte alignment information, physical-layer link control information, data resend request information or output control information on the clock. The receiver side extracts the clock phase-shift information of the transmitter side clock from the clock signal line, implements the bit deskew of the data signal line, and decodes the received data of the clock signal line at the same time to acquire the superimposed link information.

The advantages obtained by the representative features in the present invention described in the present application will be described in brief as follows.

According to an embodiment of the present invention, since the link information can be transmitted and received between the transmitter and the receiver without using the data channels, it is possible to improve the throughput of the data channels while maintaining the communication quality.

These and other objects and many of the attendant advantages of the invention will be readily appreciated as the same becomes better understood by reference to the following detailed description when considered in connection with the accompanying drawings.

DETAILED DESCRIPTION OF THE PREFERRED EMBODIMENTS

Now, a description will be given in more detail of a preferred embodiment of the present invention with reference to the accompanying drawings. In all of the drawings for explaining the embodiment, the same members are basically denoted by identical symbols, and their duplex description will be omitted.

In the embodiment of the present invention, a transceiver having a transmitting function and a receiving function will be exemplified, but the present invention can be applied to a transmitter having only the transmitting function or a receiver having only the receiving function, likewise.

Hereinafter, a basic configuration of a transceiver according to an embodiment of the present invention will be described in brief, and a specific configuration including the basic configuration will be described in more detail.

(Basic Configuration of Transceiver)

Figure 1:
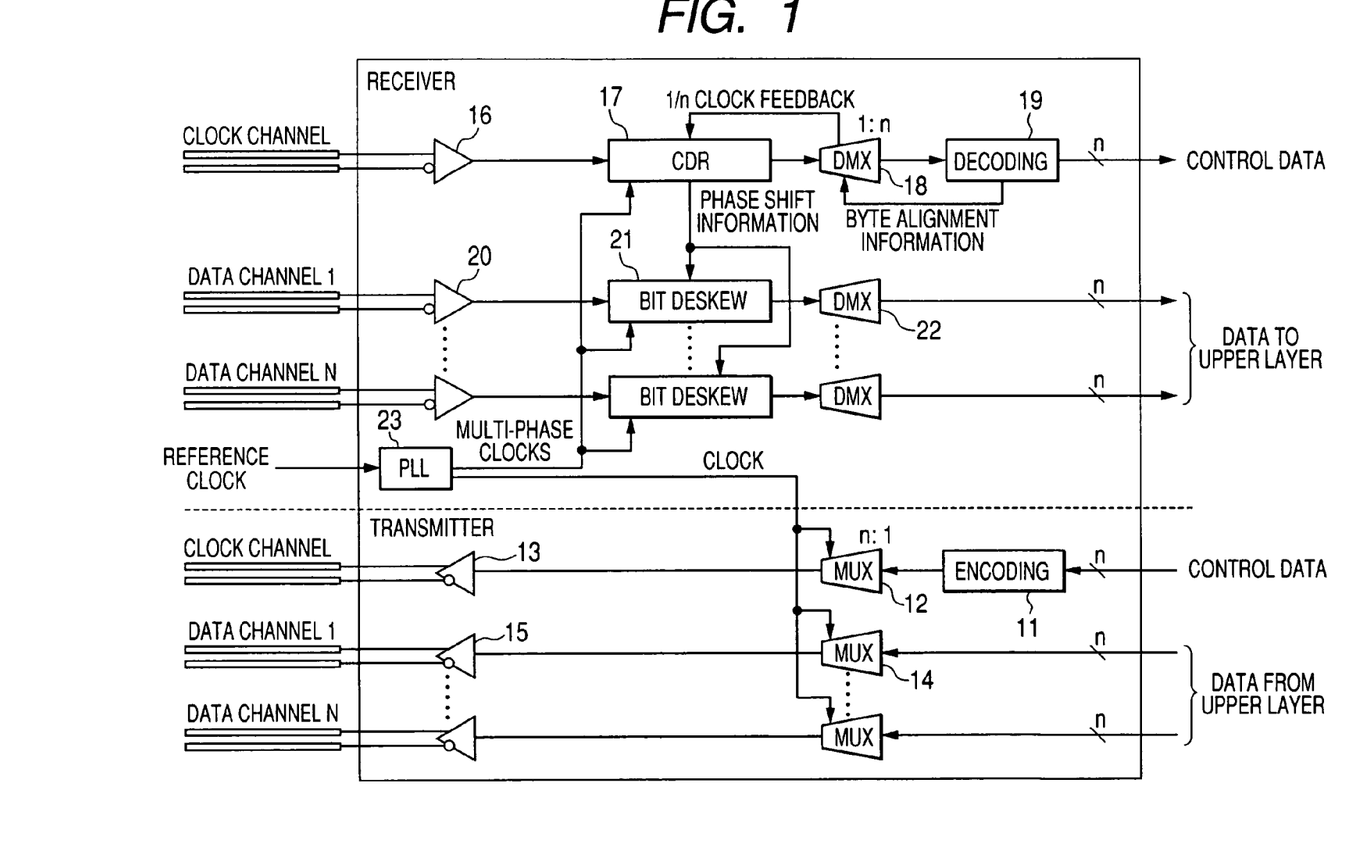
FIG. 1 is a diagram showing a basic configuration of a transceiver according to an embodiment of the present invention.

The basic configuration (physical layer) of the transceiver according to the embodiment of the present invention will be described with reference to FIG. 1. FIG. 1 is a diagram showing the basic configuration of the transceiver. Only the basic configuration of the transceiver is shown in FIG. 1, and the detailed function and operation will be described with reference to a specific configuration shown in FIG. 2 which will be described later.

The transceiver is composed of a transmitter side (a transmitter) and a receiver side (a receiver). The connection between the transmitter and the receiver is made, for example, in such a manner that a transmitter side of a first transceiver and a receiver side of a second transceiver are connected to each other, and a transmitter side of the second transceiver and a receiver side of the first transceiver are connected to each other by the aid of a clock signal line (a clock channel) and data signal lines (data channels). In the configuration, a clock and data are transmitted from the transmitter side, and the clock and the data are received by the receiver side, thereby making it possible to transmit and receive the clock and the data between the transmitter side and the receiver side.

The transmitter side of the transceiver includes an encoder circuit 11, an m:1 MUX circuit 12, and a transmission buffer 13 in a clock channel for processing control data. The transmitter side also includes N n:1 MUX circuits 14, and N transmission buffers 15 in data channels for processing data from an upper layer. The receiver side includes a reception buffer 16, a clock and data recovery circuit 17, a 1:n DMX circuit 18, and a decoder circuit 19 in a clock channel for processing the control data. The receiver side also includes N reception buffers 20, N bit deskew circuits 21, and N 1:n DMX circuits 22 in data channels for processing the data to the upper layer. The receiver side further includes a PLL circuit 23 of a reference clock.

In the transceiver according to this embodiment, the encoder circuit 11 and the n:1 MUX circuit 12 are added to the clock channel at the transmitter side as compared with the transceiver of the clock parallel transmission system (FIG. 5) that has been studied as the premise of the present invention. Also, the clock and data recovery circuit 17, the 1:n DMX circuit 18, and the decoder circuit 19 are added to the clock channel at the receiver side.

According to the basic configuration of the transceiver, more particularly, the transmitter side has the encoder circuit 11 that transmits a bit sequence obtained by encoding link information to the clock signal line. Also, the receiver side includes the clock and data recovery circuit 17 that is an extractor circuit that extracts a clock component from a signal that has been received from the clock signal line, the decoder circuit 19 that decodes the extracted signal to reproduce the link information, and the bit deskew circuit 21 that is an adjuster circuit for adjusting a skew (arrival time difference) that is lower than one bit on the basis of the clock component.

The link information that is transmitted and received through the clock signal line includes deskew control information for adjusting a skew between the data signal lines which is equal or higher than one bit, byte alignment information necessary for parallel to serial conversion, physical-layer link control information for encoding transmission, data resend request information for retransmission, and output control information for queue management.

(Specific Configuration of Transceiver)

Figure 2:
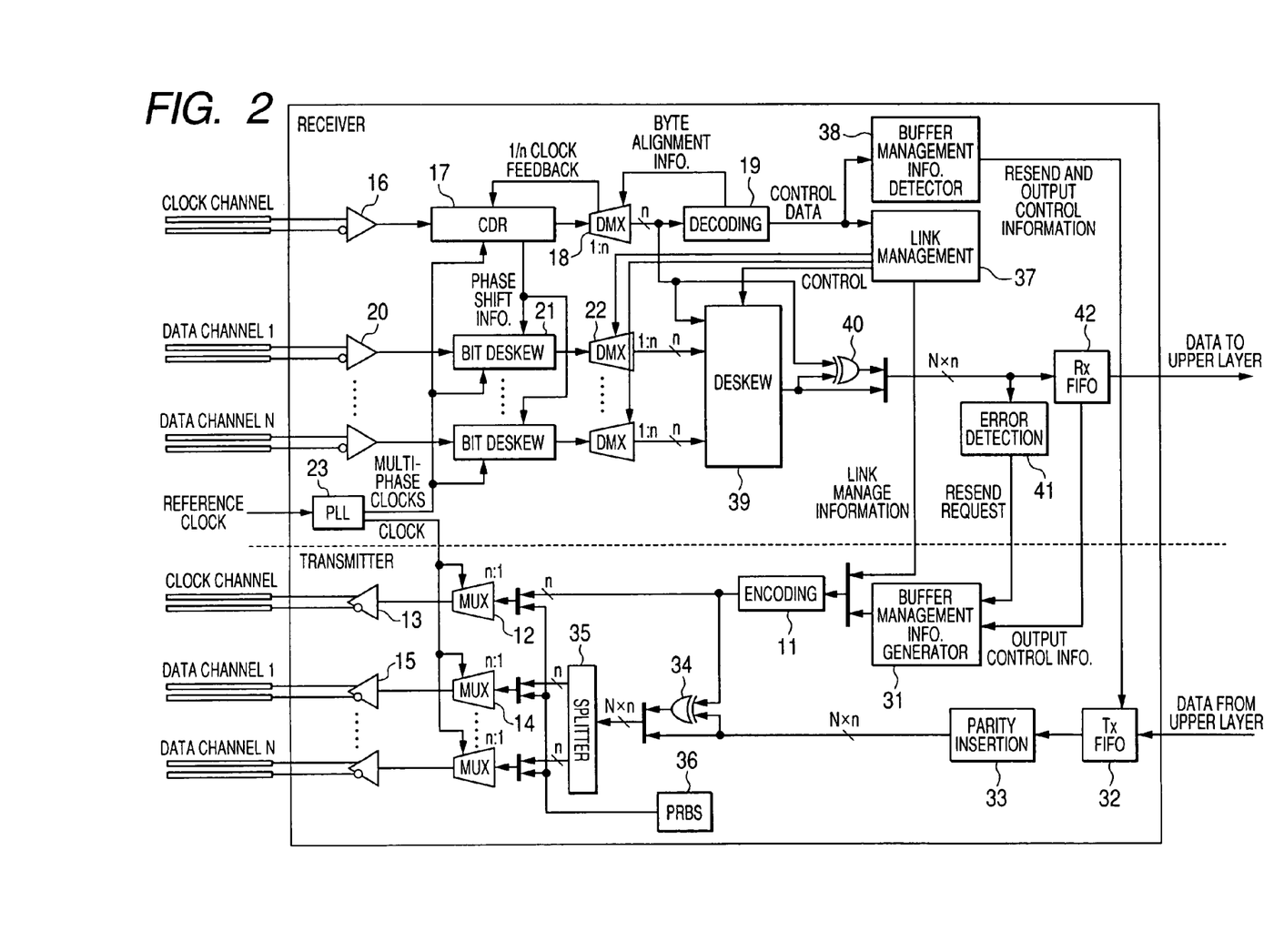
FIG. 2 is a diagram showing a specific configuration of a transceiver according to the embodiment of the present invention.
Figure 3:
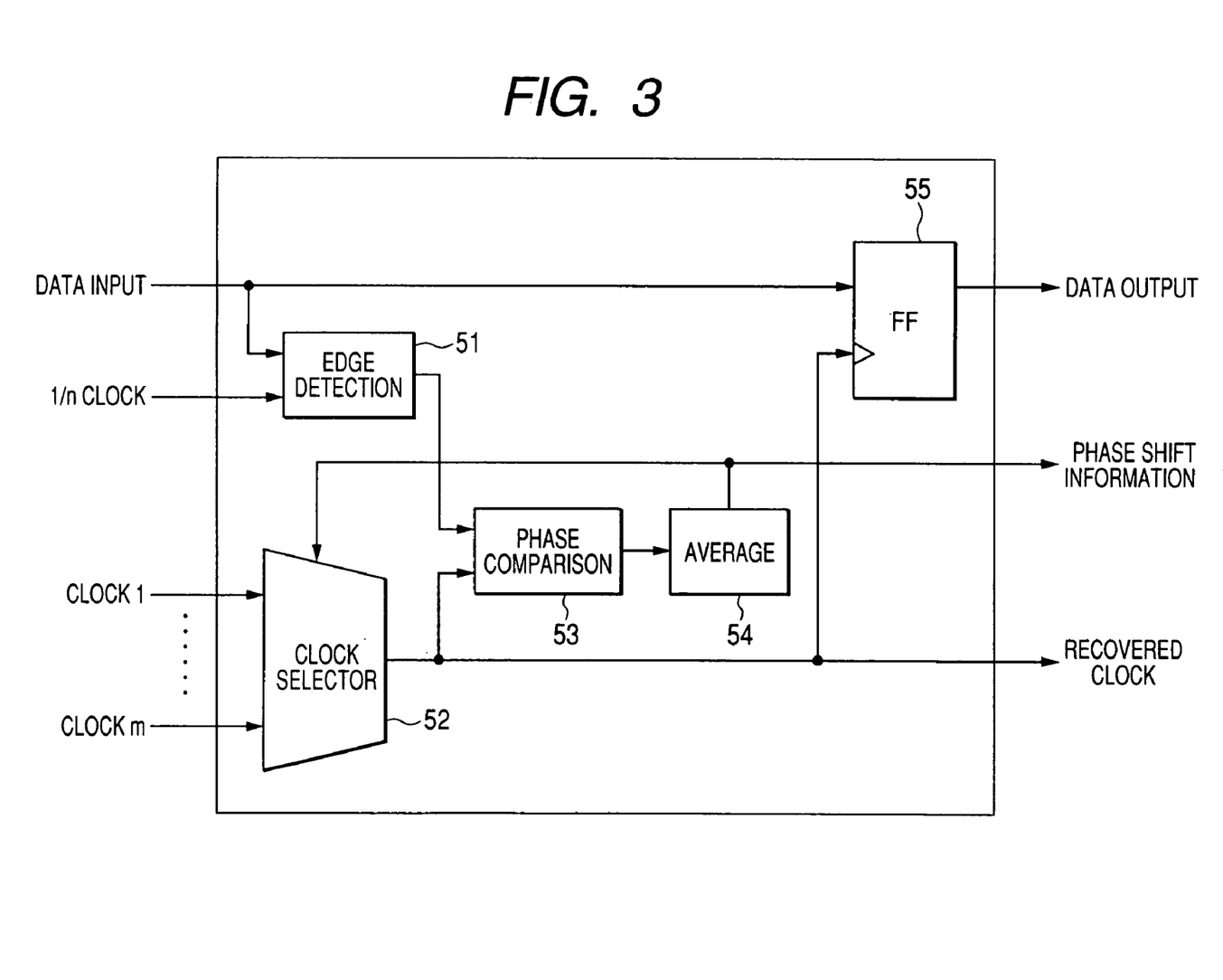
FIG. 3 is a diagram showing a configuration of a clock and data recovery circuit in the transceiver according to the embodiment of the present invention.

A description will be given of the specific configuration (physical layer+data link layer) of the transceiver according to the embodiment of the present invention with reference to FIG. 2, and the configuration of the clock and data recovery circuit with reference to FIG. 3, respectively. FIG. 2 is a diagram showing the specific configuration of the transceiver. FIG. 3 is a diagram showing the configuration of the clock and data recovery circuit.

As shown in FIG. 2, the transmitter side of the transceiver includes a buffer management information generator circuit 31, the encoder circuit 11, the n:1 MUX circuit 12, and the transmission buffer 13 in the clock channel. The transmitter side also includes a transmission FIFO 32, a parity inserter 33, a logic circuit 34, a splitter 35, a PRBS (pseudo-random bit sequence) circuit 36, the N n:1 MUX circuits 14, and the N transmission buffers 15 in the data channel.

At the transmitter side, the data resend request information and the output control information are input to the buffer management information generator circuit 31 from the receiver side. The physical-layer link control information is input to the encoder circuit 11 from the receiver side. The buffer management information generator circuit 31 is connected to the encoder circuit 11. The encoder circuit 11 is connected too the MUX circuit 12 and the logic circuit 34. The MUX circuit 12 is connected to the transmission buffer 13. The transmission FIFO 32 is input with the data from the upper layer, and the data retransmission control information and the output control information from the receiver side. The transmission FIFO 32 is connected to the parity inserter 33. The parity inserter 33 is connected to the logic circuit 34. The logic circuit 34 is connected to the splitter 35. The splitter 35 is connected to the respective MUX circuits 14. The respective MUX circuits 14 are connected to the respective transmission buffers 15. The PRBS circuit 36 is connected to the MUX circuit 12 and the respective MUX circuits 14.

Also, the receiver side of the transceiver includes the reception buffer 16, the clock and data recovery circuit 17, the 1:n DMX circuit 18, the decoder circuit 19, a link control circuit 37, and a buffer management information detector 38 in the clock channel. The receiver side also includes the N reception buffers 20, the N bit deskew circuits 21, the N 1:n DMX circuits 22, a deskew and bit string coupling circuit 39, a logic circuit 40, an error detector circuit 41, and a reception FIFO 42 in the data channels.

At the receiver side, the reception buffer 16 is connected to the clock data generator circuit 17. The clock data generator circuit 17 is connected to the DMX circuit 18 and the respective bit deskew circuits 21. The DMX circuit 18 is connected to the data reproducer circuit 17, the decoder circuit 19, the deskew and bit string coupling circuit 39, and the logic circuit 40. The decoder circuit 19 is connected to the DMX circuit 18, the link control circuit 37, and the buffer management information detector 38. The link control circuit 37 is connected to the respective DMX circuits 22 and the deskew and bit string coupling circuit 39. The physical-layer link control information is output from the link control circuit 37 to the transmitter side. The data retransmission control information and the output control information are output from the buffer management information detector 38 to the transmitter side. The reception buffers 20 are connected to the respective bit deskew circuits 21. The respective bit deskew circuits 21 are connected to the respective DMX circuits 22. The respective DMX circuits 22 are connected to the deskew and bit string coupling circuit 39. The deskew and bit string coupling circuit 39 is connected to the logic circuit 40. The logic circuit 40 is connected to the error detector circuit 41 and the reception FIFO 42. The data is output to the upper layer from the reception FIFO 42, and output control information is also output to the transmitter side from the reception FIFO 42. The data resend request information is output to the transmitter side from the error detector circuit 41.

In order to supply a multiphase clock, the PLL circuit that inputs the reference clock is connected to the clock and data recovery circuit 17 and the respective deskew circuit 21 at the receiver side. Also, in order to supply the clock, the PLL circuit is connected to the MUX circuit 12 and the respective MUX circuits 14 at the transmitter side.

As shown in FIG. 3, the clock and data recovery circuit 17 is composed of an edge detector 51, a clock selector 52, a phase comparator 53, an averaging circuit 54, and an FF circuit 55. The edge detector 51 is input with input data and a 1/n clock. The clock selector 52 is input with clocks 1 to m. The edge detector 51 and the clock selector 52 are connected to the phase comparator 53. The phase comparator 53 compares an output from the edge detector 51 with a phase of the recovered clock from the clock selector 52. The phase comparator 53 is connected to the averaging circuit 54, and phase-shift information is output from the averaging circuit 54. The phase-shift information is also output to the clock selector 52. The input data is input to the FF circuit 55, and the output data is output in synchronism with the recovered clock.

Figure 4:
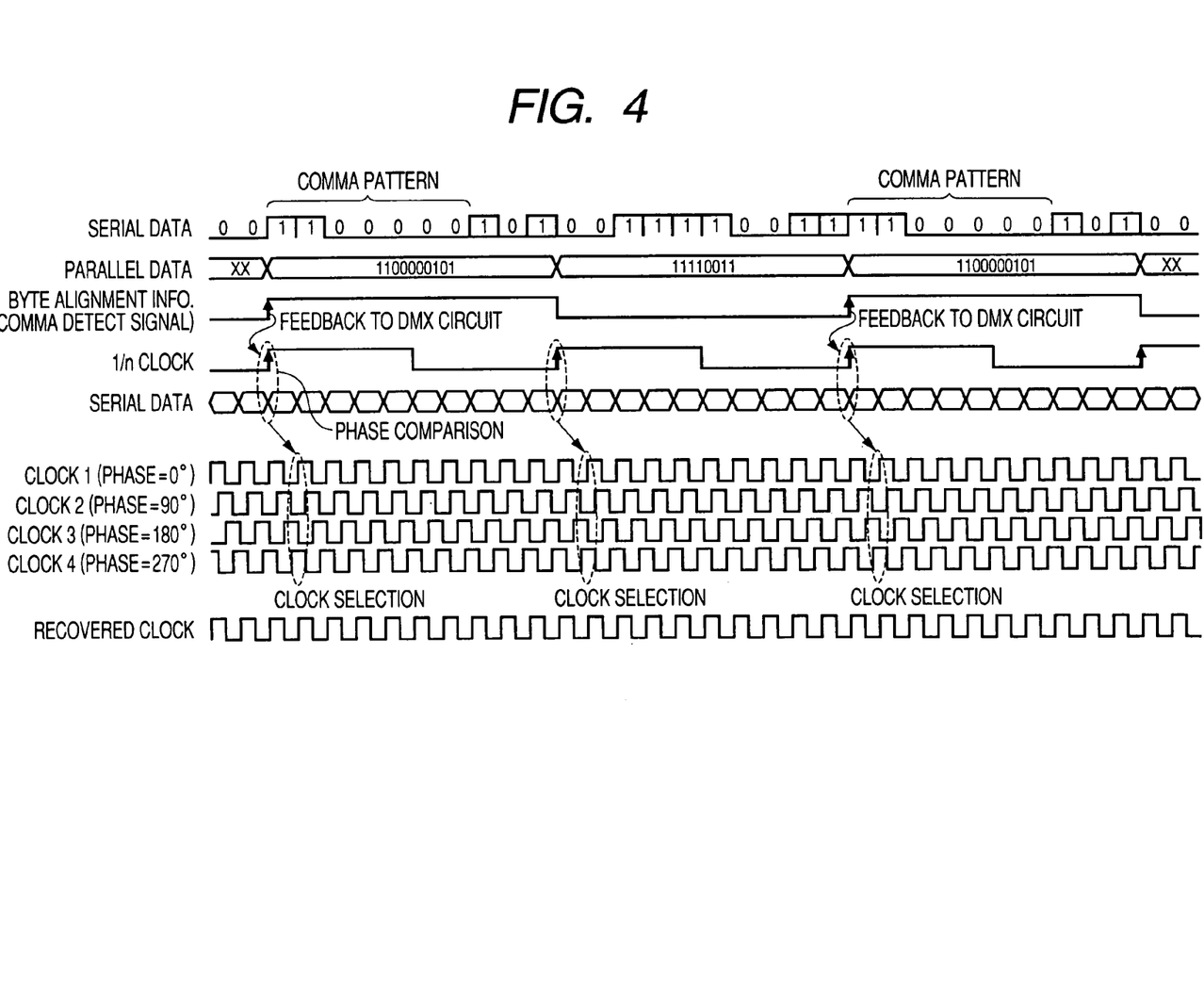
FIG. 4 is a timing chart showing a serial to parallel conversion operation in the transceiver according to the embodiment of the present invention.

The operation of the transceiver configured as described above will be described with reference to FIGS. 2 and 4. FIG. 4 is a timing chart showing the serial to parallel converting operation.

At the transmitter side, data from the upper layer (for example, a MAC sub-layer of Ethernet (registered trademark)) is stored in the transmission FIFO 32, and the data is read from the transmission FIFO 32 on the basis of the data retransmission control information and the output control information. An error detection parity is given the transmitted data from the transmission FIFO 32 by the aid of the parity inserter 33. It is assumed that the bit width of the output data is N×n bits. In this situation, for the purpose of preventing the appearance of the same bit string, the data string that has been encoded for the clock channel is XORed by the logic circuit 34 so as to conduct the simple transmission encoding. When the number of output data channels is N, the output data is divided into N n-bit width data by the splitter 35, and the respective divided data is transmitted to the N MUX circuits 14. In each of the MUX circuits 14, the data of n-bit width is converted into a serial bit string of an n-times speed, and output through the transmission buffer 15. The respective serial bit strings are transmitted to the receiver side by the aid of the N corresponding data channels 1 to N.

In the clock channel independent from the data channel, the output control information that is produced on the basis of the fulfillment status of the reception FIFO 42 at the receiving side, the data resend request information based on the detection result of the error detector circuit 41, or the physical-layer link control information (the byte alignment information or the deskew control information) from the link control circuit 37 is converted into data frames. Thereafter, the data is subjected to transmission encoding such as 8B10B by the encoder circuit 11, and then transmitted from the transmission buffer 13 through the MUX circuit 12 by the aid of the clock channel.

At the receiving side, the PLL circuit 23 transmits the clocks to the MUX circuits 12 and 14 at the transmitter side on the basis of the input reference clock. Also, m clocks (multiphase clocks) that are different in phase are transmitted to the clock and data recovery circuit 17 and the bit deskew circuit 21 at the receiver side. For example, in an example shown in FIG. 4, the multilayer clocks are of four kinds of clocks which are different in phase 90° by 90° (0°, 90°, 180°, 270°), but equal in the frequency to each other.

The clock channel and the N data channels receive the signals from the corresponding channels at the transmitter side. In this situation, as shown in FIG. 4, the clock and data recovery circuit 17 of the clock channel compares the 1/n clock that is generated by the DMX circuit 18 with the reception signal in the phase difference, and averages the phase difference in a time direction (phase-shift information). The clock and data recovery circuit 17 selects one of the multiphase clocks so as to more reduce the phase difference (FIG. 4). That is, the clock and data recovery circuit 17 reproduces the clock component from the reception signal. The clock and data recovery circuit 17 latches the reception signal by the aid of the reproduction clock to reproduce the serial bit data. The phase-shift information is also transmitted to the bit deskew circuits 21 corresponding to the respective data channels at the same time.

The serial bit data is transmitted to the DMX circuit 18, and then converted into the parallel data of the n-bit width. The parallel conversion is conducted on the basis of the byte alignment information (information indicative of boundaries of code blocks) which is output by the decoder circuit 19 for the transmission code downstream of the DMX circuit 18. For example, in the example shown in FIG. 6, a comma pattern for determining the byte alignment information is "1100000" included in the serial data. The transmission code is decoded by the decoder circuit 19 to reproduce the data frame. The data retransmission control information and the output control information of the transmission FIFO 32 are extracted from the data frame by the buffer management information detector 38, and then transmitted to the transmission FIFO 32 at the transmitter side. Also, the link control circuit 37 of the physical layer extracts the physical-layer link control information (byte alignment information, deskew control information, etc.), and conducts the byte alignment control of the DMX circuit 22 or the control of the deskew and bit string coupling circuit 39 between the channels.

The bit deskew circuit 21 converts the reception signals that have been received by the respective data channels into bit data. In this situation, the bit deskew circuit 21 selects a clock indicative of an intermediate point of the bit period from the multiphase clocks, and uses the selected clock for data latch as a reproduction clock. In the selection of the multiphase clocks, the clock and data recovery circuit 17 follows the phase fluctuation (clock wander) of the long period with reference to the phase-shift information that is output by the data reproducer circuit 17.

The data that has been converted into the serial bit is subjected to parallel conversion by the respective DMX circuits 22. The conversion is conducted on the basis of the byte alignment information that has been transmitted by the clock channel. Because the N n-bit width data of the outputs of the DMX circuits 22 has the skew of the byte unit (n bit unit), respectively, the deskew bit string coupling circuit 39 absorbs the skew. The deskew and bit string coupling circuit 39 receives the PRBS patterns that are generated and transmitted to all of the channels at the same time by the PRBS circuit 36 at the transmitter side in advance. Then, the deskew and bit string coupling circuit 39 operates the read timing (or write timing) of the FIFO in the interior of the deskew and bit string coupling circuit 39 so as to make the period phases of the contiguous patterns identical with each other. The above operation is continued even in a state where the PRBS pattern is not transmitted (that is, in a state where the normal data pattern is transmitted), to thereby eliminate the skew. The deskew and bit string coupling circuit 39 couples N n-bit data from which the skew is eliminated as a piece of bit string data, and outputs the coupled data. In this situation, in the case where the transmitter side conducts the above simple transmission encoding, the receiver side XORs the data that has been received by the clock channel by the logic circuit 40, to thereby encode the data, likewise.

The receiver side extracts the parity data that has been given by the transmitter side from the data of N×n bit width obtained therefrom, and detects an error on the basis of the extracted parity data. When an error occurs, the receiver side generates the data resend request information so as to retransmit the corresponding data portion, and transmits the generated data to the buffer management information generator circuit 31 at the transmitter side.

The reception FIFO 42 temporarily stores the data in the FIFO, and transmits the data to the upper layer. In this situation, the reception FIFO 42 transmits information (output control information) that controls the output quantity of the transmission FIFO 32 at the transmitter side to the buffer management information generator circuit 31 at the transmitter side so that the reception FIFO 42 is not filled with the data.

As described above, according to the transceiver of the present invention, the encoder circuit 11 is disposed at the transmitter side, and the clock and data recovery circuit 17, the decoder circuit 19, and the bit deskew circuit 21 are disposed at the receiver side. With the above configuration, the bit sequence obtained by encoding the link information is transmitted to the clock signal line at the transmitter side. At the receiver side, the clock component is extracted from the signal that has been received from the clock signal line, and the extracted signal is decoded to reproduce the link information so that the skew that is lower than one bit can be adjusted on the basis of the clock component. With the above operation, the link information can be transmitted and received without using the data channel. As a result, the load on the data signal lines is reduced while maintaining the communication quality, thereby enabling the throughput of the data channels to be improved.

The present invention that has been made by the present inventors has been described in more detail with reference to the embodiments. However, the present invention is not limited to the above embodiment, and it will be obvious that various changes may be made without departing from the scope of the invention.

For example, the transceiver having the transmitting function and the receiving function is exemplified in the above embodiment. However, the present invention is not limited to the above configuration, and can be applied to a transmitter having the transmitting function or a receiver having only the receiving function likewise.

That is, the transmitter can be realized by the provision of at least the encoder circuit that transmits the bit sequence obtained by encoding the link information to the clock signal line. Also, the receiver can be realized by the provision of at least the extractor circuit that extracts the clock component from the signal that has been received from the clock signal line, the decoder circuit that decodes the extracted signal to reproduce the link information, and the deskew circuit that adjusts the skew that is lower than one bit on the basis of the clock component.

The present invention relates to the transmitting and receiving technique, and more particularly can be applied to the transceiver of the clock parallel transmission system, the transmitter, and the receiver.

What is claimed is:

1. A transceiver, comprising:
a clock signal line;
data signal lines;
a transmitter that transmits a clock signal to the clock signal line and respectively transmits data signals to the data signal lines; and
a receiver that receives the clock signal and the data signals which are transmitted through the clock signal line and the data signal lines,
wherein the transmitter includes an encoder circuit that transmits a bit sequence obtained by encoding link information including byte alignment information to the clock signal line, and
wherein the receiver includes a clock and data recovery circuit that extracts a clock component from the signal that is received from the clock signal line and recovers the bit sequence from the signal that is received from the clock signal line by using the extracted clock component, a decoder circuit that decodes the recovered bit sequence to reproduce the link information, a first deskew circuit that adjusts a skew among the signals received from the respective data signal lines in a time range lower than one bit on the basis of the clock component, a plurality of demultiplexers respectively converting the recovered bit sequence and outputs of the first deskew circuit into parallel data based on byte alignment information extracted from the reproduced link information, and a second deskew circuit that eliminates misalignments in the parallel data due to a bitwise skew remaining among the outputs of the first deskew circuit.

2. The transceiver according to claim 1, wherein the link information includes physical-layer link information for transmission.

3. The transceiver according to claim 1, wherein the link information includes data resend request information for retransmission.

4. The transceiver according to claim 1, wherein the link information includes output control information for queue management.

5. A transmitter that transmits a clock signal and data signals by the aid of a clock signal line and data signal lines, the transmitter comprising:
a plurality of multiplexers, each being provided with n-bit parallel signals indicative of data to be transmitted from an upper layer and converting the parallel signals into a serial bit sequence;
a plurality of transmitting buffers transmitting outputs of the multiplexers to the data lines respectively;
an encoder circuit that encodes link information into transmission code;
an additional multiplexer converting the transmission code into a serial bit string having a clock signal component indicative of transitions between bits of said outputs of the multiplexers; and
an additional transmitting buffer transmitting output of the additional multiplexer to the clock signal line,
wherein said transmission code includes a particular pattern indicative of byte alignment of outputs of the plurality of multiplexers and the additional multiplexer.

6. The transmitter according to claim 5, wherein the link information includes physical-layer link information for transmission.

7. The transmitter according to claim 5, wherein the link information includes data resend request information for retransmission.

8. The transmitter according to claim 5, wherein the link information includes output control information for queue management.

9. A receiver that receives a clock signal and data signals which are transmitted from a transmitter by the aid of a clock signal line and data signal lines, the receiver comprising:
clock and data recovery circuit that extracts a clock component from a signal that is received from the clock signal line and recovers a bit sequence from the signal that is received from the clock signal line by using the extracted clock component;
a decoder circuit that decodes parallel data derived from the recovered bit sequence to reproduce link information;
a first deskew circuit that adjusts a skew among the signals received from the respective data signal lines in a time range lower than one bit on the basis of the clock component;
a plurality of demultiplexers respectively converting the recovered bit sequence and outputs of the first deskew circuit into parallel data based on byte alignment information extracted from the reproduced link information; and
a second deskew circuit that eliminates misalignments in the parallel data due to a bitwise skew remaining among the outputs of the first deskew circuit.

10. The receiver according to claim 9, wherein the link information includes physical-layer link control information for transmission code.

11. The receiver according to claim 9, wherein the link information includes data resend request information for retransmission.

12. The receiver according to claim 9, wherein the link information includes output control information for queue management.

* * * * *